(12) United States Patent
Moon et al.

(10) Patent No.: US 10,300,478 B2
(45) Date of Patent: May 28, 2019

(54) BIPOLAR ION EXCHANGE SHEET AND MANUFACTURING METHOD THEREFOR

(71) Applicant: COWAY CO., LTD., Chungcheongnam-do (KR)

(72) Inventors: Sung-Min Moon, Seoul (KR); Jun-Young Lee, Seoul (KR); Sun-Beom Choi, Seoul (KR); Sang-Hyeon Kang, Seoul (KR); Kyung-Seok Kang, Daejeon (KR); Won-Keun Son, Daejeon (KR)

(73) Assignee: Coway co., Ltd (KR)

( * ) Notice: Subject to any disclaimer, the term of this patent is extended or adjusted under 35 U.S.C. 154(b) by 134 days.

(21) Appl. No.: 15/528,287

(22) PCT Filed: Sep. 16, 2015

(86) PCT No.: PCT/KR2015/009728
§ 371 (c)(1),
(2) Date: May 19, 2017

(87) PCT Pub. No.: WO2016/080642
PCT Pub. Date: May 26, 2016

(65) Prior Publication Data
US 2017/0320053 A1 Nov. 9, 2017

(30) Foreign Application Priority Data

Nov. 19, 2014 (KR) .................. 10-2014-0161639
Sep. 10, 2015 (KR) .................. 10-2015-0128108

(51) Int. Cl.
| | | |
|---|---|---|
| *B01J 47/12* | (2017.01) | |
| *B01D 61/46* | (2006.01) | |
| *B01D 69/02* | (2006.01) | |
| *B01D 69/12* | (2006.01) | |
| *B01D 71/26* | (2006.01) | |
| *B01D 71/52* | (2006.01) | |
| *B01J 39/04* | (2017.01) | |
| *B01J 39/18* | (2017.01) | |
| *B01J 41/04* | (2017.01) | |
| *B01J 41/12* | (2017.01) | |
| *B01D 61/44* | (2006.01) | |
| *B01J 23/745* | (2006.01) | |
| *B01J 35/00* | (2006.01) | |
| *B01J 37/02* | (2006.01) | |
| *C02F 1/461* | (2006.01) | |
| *C02F 1/469* | (2006.01) | |
| *B01J 47/016* | (2017.01) | |

(52) U.S. Cl.
CPC ............ *B01J 47/12* (2013.01); *B01D 61/445* (2013.01); *B01D 61/46* (2013.01); *B01D 69/02* (2013.01); *B01D 69/12* (2013.01); *B01D 71/26* (2013.01); *B01D 71/52* (2013.01); *B01J 23/745* (2013.01); *B01J 35/0013* (2013.01); *B01J 37/0215* (2013.01); *B01J 37/0236* (2013.01); *B01J 39/04* (2013.01); *B01J 39/18* (2013.01); *B01J 41/04* (2013.01); *B01J 41/12* (2013.01); *B01J 47/016* (2017.01); *C02F 1/4618* (2013.01); *C02F 1/4693* (2013.01); *B01D 2325/10* (2013.01); *B01D 2325/24* (2013.01); *B01D 2325/42* (2013.01); *C02F 2201/46115* (2013.01)

(58) Field of Classification Search
CPC ...... B01J 47/12; B01J 23/745; B01J 35/0013; B01J 37/0215; B01J 37/0236; B01J 39/04; B01J 39/18; B01J 41/04; B01J 41/12; B01D 61/445; B01D 61/46; B01D 69/02; B01D 69/12; B01D 71/26; B01D 71/52; C02F 1/4618; C02F 1/4693
USPC .......................................................... 521/25
See application file for complete search history.

(56) References Cited

U.S. PATENT DOCUMENTS

| | | | |
|---|---|---|---|
| 3,945,927 A | 3/1976 | Imai et al. | |
| 2006/0016685 A1* | 1/2006 | Hawkins ............ | B01D 61/445 |
| | | | 204/296 |

FOREIGN PATENT DOCUMENTS

| | | | | |
|---|---|---|---|---|
| EP | 0 143 582 | | 6/1985 | |
| EP | 1 174 187 | | 1/2002 | |
| EP | 2368933 | | 9/2011 | |
| GB | 2 122 543 | | 1/1984 | |
| JP | 10087853 | | 4/1998 | |
| JP | 10087853 A | * | 4/1998 | |
| JP | 2010132829 | | 6/2010 | |
| JP | 2010132829 A | * | 6/2010 | ........... B01D 61/445 |
| KR | 1020070052285 | | 5/2007 | |
| KR | 1020100018759 | | 2/2010 | |
| KR | 1020100018759 A | * | 11/2010 | |
| KR | 101330571 | | 11/2013 | |

(Continued)

OTHER PUBLICATIONS

European Search Report dated Nov. 30, 2017 issued in counterpart application No. 15861924.7-1371, 8 pages.

*Primary Examiner* — Michael Bernshteyn
(74) *Attorney, Agent, or Firm* — The Farrell Law Firm, P.C.

(57) ABSTRACT

The present invention relates to a bipolar ion exchange sheet and a manufacturing method therefor, the bipolar ion exchange sheet comprising: a cation exchange film comprising a cation adsorption sheet and a cation exchange coating layer formed on one side of the cation adsorption sheet; and an anion exchange film comprising an anion adsorption sheet and an anion exchange coating layer formed on one side of the anion adsorption sheet, wherein the cation exchange film and the anion exchange film are bonded so that the cation exchange coating layer and the anion exchange coating layer face each other.

18 Claims, 4 Drawing Sheets

(56) References Cited

FOREIGN PATENT DOCUMENTS

KR 101330571 B1 * 11/2013
WO WO 2006/015034 2/2006

* cited by examiner

BIPOLAR ION EXCHANGE SHEET AND MANUFACTURING METHOD THEREFOR

PRIORITY

This application is a National Phase Entry of PCT International Application No. PCT/KR2015/009728, which was filed on Sep. 16, 2015, and claims priority to Korean Patent Application Nos. 10-2014-0161639 and 10-2015-0128108, which were filed on Nov. 19, 2014 and Sep. 10, 2015, respectively, the contents of each of which are incorporated herein by reference.

TECHNICAL FIELD

The present disclosure relates to a bipolar ion exchange sheet and a manufacturing method therefor.

BACKGROUND ART

An ion exchange membrane, a separation membrane, uses the momentum of mass transfer as electromotive force in separating ionic materials. When cation exchange membrane systems supply current through anodes and cathodes, cations included in electrolyte solutions move to the cathode through ion exchange membranes, and anions cannot penetrate through the ion exchange membrane through the Donnan exclusion of cation exchange membranes. Likewise, anion exchange membrane systems enable anions included in the electrolyte solution to move to the anode through ion exchange membranes, and prevent cations from penetrating the ion exchange membrane by the Donnan exclusion of anion exchange membranes. In such a manner, ionic materials may be separated.

In the same way, when current is supplied while cation exchange membranes and anion exchange membranes are bonded to each other, such that cation exchange layers are oriented toward cathodes and anion exchange layers are oriented toward anodes, water molecules are decomposed into hydrogen ions ($H^+$) and hydroxide ions ($OH^-$) to move to the cathode and the anode, respectively, thus manufacturing acids or bases. This process may be applied in various types of chemical and biological processes.

Meanwhile, the water decomposition characteristics of bipolar membranes depend on the ion selectivity and membrane resistance of respective ion exchange membranes that form systems. When a degree of ion selectivity is low, a co-ion leakage phenomenon may cause a reduction in water decomposition efficiency (or current efficiency), and when a level of membrane resistance is high, water decomposition efficiency may be reduced at a constant potential. Bipolar ion exchange sheets have been produced by using a conventional method of producing a sheet using cation or anion exchange resin powders and polyethylene binders and coating a mixture having an opposite polarity thereon. Bipolar ion exchange sheets have good ion adsorption characteristics but low ion selectivity and high membrane resistance to reduce water decomposition efficiency. In order to regenerate bipolar ion exchange sheets, a high level of voltage is required to be applied thereto, which may cause the generation of heat.

Related Art Document: (Patent Document 1) Korean Patent Publication No. 2007-0052285

DISCLOSURE

Technical Problem

The present invention has been made to solve the above problems, and the object of the present disclosure is to provide a bipolar ion exchange sheet which may have excellent mechanical properties and low resistance and may improve water decomposition characteristics by adsorbing or desorbing ions in an electrical manner without using chemicals, and a manufacturing method therefor.

Meanwhile, the object of the present disclosure is not limited to the above description. The subject matter of the present disclosure can be understood from the overall context of the present specification. It will be understood by a person skilled in the art that there is no difficulty in understanding the additional subject matters of the present disclosure.

Technical Solution

According to an aspect of the present disclosure, a bipolar ion exchange sheet may include: a cation exchange membrane including a cation adsorption sheet and a cation exchange coating layer formed on one surface of the cation adsorption sheet; and an anion exchange membrane including an anion adsorption sheet and an anion exchange coating layer formed on one surface of the anion adsorption sheet, in which the cation exchange membrane may be bonded to the anion exchange membrane such that the cation exchange coating layer may be in contact with the anion exchange coating layer.

Each of the cation adsorption sheet and the anion adsorption sheet may be an extruded film.

The cation adsorption sheet may include a cation exchange resin powder and a binder, and the anion adsorption sheet may include an anion exchange resin powder and a binder.

Each of the cation adsorption sheet and the anion adsorption sheet may be a porous film.

Each of the cation adsorption sheet and the anion adsorption sheet may have a thickness of 10 µm to 1,000 µm.

The cation exchange coating layer may include a polymer having a cation exchange group, and the anion exchange coating layer may include a polymer having an anion exchange group. The cation exchange coating layer and the anion exchange coating layer may include metal hydroxide nanoparticles.

Each of the cation exchange coating layer and the anion exchange coating layer may have a thickness of 0.1 µm to 200 µm, and may also have a thickness of 1 µm to 9 µm.

The bipolar ion exchange sheet may further include a water decomposition catalyst layer between the cation exchange coating layer and the anion exchange coating layer.

The water decomposition catalyst layer may include metal hydroxide nanoparticles, and the metal hydroxide nanoparticles may be at least one selected from the group consisting of iron hydroxide and chromium hydroxide.

The bipolar ion exchange sheet may further have a symmetrical structure around a boundary between the cation exchange coating layer and the anion exchange coating layer.

According to an aspect of the present disclosure, a water treatment system may include at least one of the bipolar ion exchange sheets described above.

According to an aspect of the present disclosure, a method of manufacturing a bipolar ion exchange sheet may include: producing a cation adsorption sheet and an anion adsorption sheet; producing, respectively, a cation exchange membrane and an anion exchange membrane by coating a cation exchange coating solution on one surface of the cation adsorption sheet to form a cation exchange coating layer and by coating an anion exchange coating solution on one surface of the anion adsorption sheet to form an anion exchange coating layer; and bonding the cation exchange membrane to the anion exchange membrane such that the cation exchange coating layer is in contact with the anion exchange coating layer.

Each of the cation adsorption sheet and the anion adsorption sheet may be an extruded film produced by melting and extruding a mixture of a binder resin and each of a cation exchange resin powder and an anion exchange resin powder.

Each of the cation exchange coating solution and the anion exchange coating solution may include metal hydroxide nanoparticles.

Each of the cation exchange coating solution and the anion exchange coating solution may be coated at a thickness of 1 μm to 9 μm.

The method may further include forming a water decomposition catalyst layer on one of the cation exchange membrane and the anion exchange membrane.

The water decomposition catalyst layer may be formed by coating slurry, having metal hydroxide nanoparticles dispersed in a solvent, on one of the cation exchange membrane and the anion exchange membrane. The metal hydroxide nanoparticles may be at least one selected from the group consisting of iron hydroxide and chromium hydroxide.

The foregoing technical solutions to the above-mentioned problems do not fully enumerate all of the features of the present disclosure. Various features of the present disclosure and the resulting advantages and effects will be understood in more detail with reference to the following detailed examples.

Advantageous Effects

A bipolar ion exchange sheet according to examples may achieve low membrane resistance, may significantly increase water decomposition efficiency and adsorption or desorption characteristics, and may improve regeneration efficiency, even at a low level of voltage, by adsorbing or desorbing ions in an electrical manner without using chemicals.

Further, the bipolar ion exchange sheet according to the examples may increase ion exchange capacity, may have excellent, thermal and mechanical stability and durability, as well as electrical characteristics, and may be applied and utilized in various industrial fields, such as the production of clean water, soft water, industrial water, and ultrapure water.

Meanwhile, a method of manufacturing a bipolar ion exchange sheet according to the examples may be simple in processes to reduce manufacturing costs, resulting in excellent productivity and economic feasibility.

BEST MODE FOR INVENTION

Figure 1:
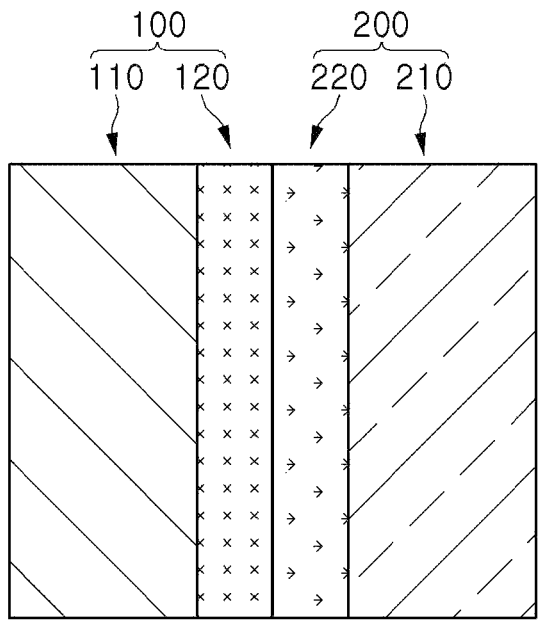
FIG. 1 is a cross-sectional view of a bipolar ion exchange sheet according to an embodiment in the present disclosure.

Exemplary embodiments of the present disclosure will now be described in detail with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the invention to those skilled in the art. The shapes or sizes of components shown in the drawings are exaggerated for clarity.

With repeated research to solve the above-mentioned problems, the inventors have realized a bipolar ion exchange sheet according to an example in the present disclosure, which may include a cation exchange membrane including a cation adsorption sheet and a cation exchange coating layer formed on one surface of the cation adsorption sheet; and an anion exchange membrane including an anion adsorption sheet and an anion exchange coating layer formed on one surface of the anion adsorption sheet. The cation exchange membrane may be bonded to the anion exchange membrane such that the cation exchange coating layer may be in contact with the anion exchange coating layer.

Figure 2:
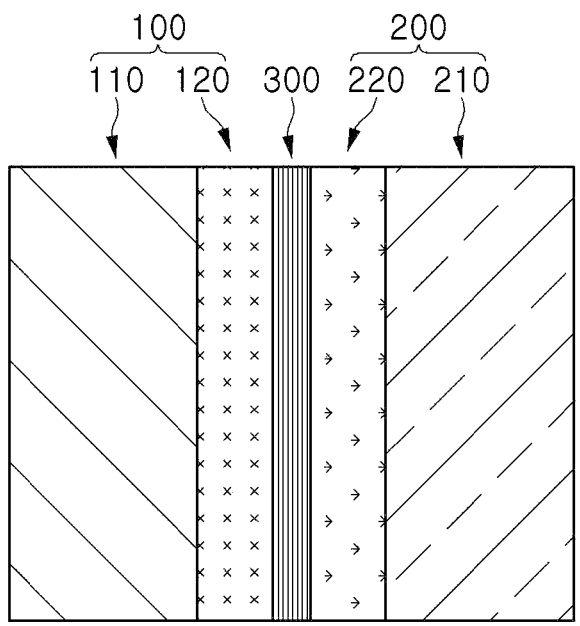
FIG. 2 is a cross-sectional view of a bipolar ion exchange sheet according to another embodiment in the present disclosure.

Hereinafter, with reference to FIGS. 1 and 2, bipolar ion exchange sheets according to examples will be described in more detail. FIGS. 1 and 2 are schematic cross-sectional views of the bipolar ion exchange sheets according to the examples.

The bipolar ion exchange sheet according to the example, as illustrated in FIG. 1, may have a structure in which a cation exchange membrane 100 including a cation adsorption sheet 110 and a cation exchange coating layer 120 formed on one surface of the cation adsorption sheet 110; and an anion exchange membrane 200 including an anion adsorption sheet 210 and an anion exchange coating layer 220 formed on one surface of the anion adsorption sheet 210, in which the cation exchange membrane 100 may be bonded to the anion exchange membrane 200 such that the cation exchange coating layer 120 may be in contact with the anion exchange coating layer 220.

First, the cation adsorption sheet and the anion adsorption sheet may be provided to basically serve a function to adsorb and exchange cations and anions in the bipolar ion exchange sheet. Materials of the cation adsorption sheet and the anion adsorption sheet are not particularly limited as long as they may perform such a function. It may be more preferable that the cation adsorption sheet and the anion adsorption sheet may include ion exchange resin powders and binders in terms of effectively deriving the effect of the present disclosure.

The ion exchange resin powders may refer to a cation exchange resin powder and an anion exchange resin powder, respectively, and may be used in an example in the present disclosure without particular limitation, as long as they may be commonly used as materials that may exchange cations and anions.

For example, the cation exchange resin powder is not limited thereto, may be a power of an ion exchange resin, having a cation exchange group, such as a sulfonic acid group ($-SO_3H$), a carboxyl group ($-COOH$), a phosphonic group ($-PO_3H_2$), a phosphinic group ($-HPO_2H$), an arsenic group ($-AsO_3H_2$), a selenonic group ($-SeO_3H$), or the like. In addition, the anion exchange resin powder is not limited thereto, and may be a power of an ion exchange resin, having an anion exchange group, such as quaternary ammonium salt ($-NH_3$), primary to tertiary amine ($-NH_2$, $-NHR$, $-NR_2$), a quaternary phosphonium group ($-PR_4$), a tertiary sulfonium group ($-SR_3$), or the like.

As the ion exchange resin powder, an ion exchange resin powder having an average particle diameter of 1 μm to 500 μm may be used. An ion exchange resin powder having an average particle diameter of less than 1 μm may cause an increase in manufacturing costs, may be difficult to be dispersed uniformly, and an ion exchange resin powder having an average particle diameter of greater than 500 μm may cause a significant reduction in an ion exchange specific surface area, so as to greatly degrade ion adsorption performance per unit time than using small particles. It may be more preferable that the ion exchange resin powder have an average particle diameter of 1 μm to 100 μm.

Meanwhile, the binder may be molten at a temperature less than or equal to that at which a functional group of an ion exchange resin powder, such as linear low density polyethylene (LLDPE), low density polyethylene (LDPE), a polyethylene (PE)-based copolymer, polypropylene (PP), ethylene vinyl alcohol (EVA), ethylene octene rubber (EOR), and the like, is not decomposed, and the binder may be uniformly mixed with the ion exchange resin powder, and may be used without particular limitation, as long as the binder may bind the ion exchange resin powder. For example, LLDPE or EVA may be used as the binder.

The binder is not particularly limited, but a granular resin may be used, and the binder may also be used in powder form by being processed for uniform mixing with the ion exchange resin before being molten. As the binder, a binder having an average particle diameter of 1 μm to 2,000 μm, more preferably 1 μm to 700 μm, may be used.

At this time, when mixing the ion exchange resin powder with the binder, it may be preferable that a content of the binder be 10 wt % to 70 wt %. When the content of the binder is less than 10 wt %, melt flowability may be low in manufacturing an extruded film by melt extrusion, so that it may not be easy to manufacture the extruded film. When the content of the binder exceeds 70 wt %, the ion exchange resin powder may be completely surrounded by a polymer binder, so that ion selectivity may be degraded and that the extruded film may not have porosity, thus increasing ion adsorption sheet resistance. Accordingly, ion adsorption capabilities may be reduced, or water decomposition efficiency may be decreased. More preferably, the content of the binder resin may be from 30 wt % to 50 wt %.

The ion adsorption sheet (including a cation adsorption sheet and an anion adsorption sheet and, hereinafter, used in the same sense unless otherwise mentioned) may preferably be an extruded film. In an example, an ion exchange coating solution may be coated on the ion adsorption sheet to form an ion exchange coating layer, and the ion adsorption sheet may function as a substrate in the bipolar ion exchange sheet according to an example. Thus, it may be preferable to use an extruded film as the ion adsorption sheet, such that the ion adsorption sheet may function as a support.

Meanwhile, the extruded film may be manufactured by an easier process by using the extruded film as the ion adsorption sheet, and the manufacturing costs of the ion adsorption sheet may be markedly reduced. The ion adsorption sheet may be required to have a constant thickness to secure sufficient ion adsorption capacity. When the sheet is manufactured from an ion exchange resin solution, an amount of the ion exchange resin solution may be increased, incurring high expenses. Drying the ion exchange resin solution may be time-consuming. After the drying, the ion exchange resin solution may have hard physical properties. When coiled in roll form, the dried ion exchange resin solution may be easy to break. However, in the case of manufacturing and using the extruded film, such problems may be solved. Further, the ion adsorption sheet may provide an advantage that a thickness of the ion exchange coating layer may be formed to be significantly reduced by forming the ion exchange coating layer on a surface of the ion adsorption sheet, formed as the extruded film, by coating the solution. This will be described hereinafter in more detail.

An extruded film, manufactured by using, melting and extruding a mixture of the ion exchange resin powder and the binder resin described above, may be used as the ion adsorption sheet. At this time, the ion adsorption sheet may be porous. The ion adsorption sheet may preferably have a porous structure in order to adsorb ions exchanged by the ion exchange coating layer, and membrane resistance of the ion adsorption sheet may be reduced to increase water decomposition efficiency.

Meanwhile, thicknesses of the cation adsorption sheet and the anion adsorption sheet are not particularly limited, and the cation adsorption sheet and the anion adsorption sheet may be required to have thicknesses at which they may function as substrates. For example, considering membrane resistance and ion adsorption capacity according to thicknesses, each of the cation adsorption sheet and the anion adsorption sheet may have a thickness of 10 μm to 1,000 μm, more preferably 50 μm to 500 μm.

Subsequently, as illustrated in FIG. 1, the ion adsorption sheets 110 and 210 may have the ion exchange coating layers 120 and 220 (including the cation exchange coating layer and the anion exchange coating layer, and hereinafter, used in the same sense unless otherwise mentioned) having the same polarity on one surfaces of the ion exchange coating layers 120 and 220, in order to improve water decomposition efficiency with higher ion selectivity and low membrane resistance. In detail, the cation exchange coating layer 120 may be formed on the one surface of the cation adsorption sheet 110, and the anion exchange coating layer 220 may be formed on the one surface of the anion adsorption sheet 210.

The cation exchange coating layer and the cation exchange coating layer may include a polymer, having a cation exchange group, and a polymer, having an anion exchange group, respectively. The respective ion exchange polymers (including the cation exchange polymer and the anion exchange polymer, and used in the same sense, unless otherwise mentioned) may be applied in an example without particular limitation, as long as they have an ion exchange group commonly used in the art to which the present disclosure belongs.

The ion exchange polymer is not limited thereto, may be a cation exchange polymer, having a cation exchange group, such as a sulfonic acid group ($-SO_3H$), a carboxyl group ($-COOH$), a phosphonic group ($-PO_3H_2$), a phosphinic group ($-HPO_2H$), an arsenic group ($-AsO_3H_2$), a selenonic group ($-SeO_3H$), or the like, and an anion exchange polymer, having an anion exchange group, such as quaternary ammonium salt ($-NH_3$), primary to tertiary amine ($-NH_2$, $-NHR$, $-NR_2$), a quaternary phosphonium group ($-PR_4$), a tertiary sulfonium group ($-SR_3$), or the like.

In detail, the ion exchange polymer may be, for example, one or two or more mixtures selected from polystyrene, polysulfone, polyethersulfone, polyamide, polyphenylene oxide, polyester, polyimide, polyether, polyethylene, polytetrafluoroethylene and polyglycidyl methacrylate, is not limited thereto, and may be used, as long as it may have a cation exchange group or an anion exchange group.

The respective ion exchange polymers may be dissolved in an organic solvent to be produced as a coating solution, coated on the one surfaces of the ion adsorption sheet, and then dried. By such drying, the organic solvent may evaporate.

A suitable organic solvent may be selected and used as the organic solvent for the ion exchange polymer according to a type of ion exchange polymer, and is not particularly limited. One or two or more mixtures selected from dimethylformamide, dimethylacetamide, N-methyl-2-pyrrolidone acetone, chloroform, dichloromethane, trichlorethylene, ethanol, methanol and normal hexane may be used. It may only be preferable to use an organic solvent in which the binder of the ion exchange sheet is not dissolved.

Meanwhile, thicknesses of the cation exchange coating layer and the anion exchange coating layer are not particularly limited, and the cation exchange coating layer and the anion exchange coating layer may be formed to be, for example, 200 µm or less (excluding 0), respectively. As described above, the ion exchange coating layer may be provided to further improve the ion selectivity and the water decomposition efficiency, and due to the presence of such an ion exchange coating layer, the effect may be sufficiently achieved. However, when the ion exchange coating layer is excessively thick, a problem may occur in which the membrane resistance may be increased to degrade the water decomposition efficiency; thus, it may be preferable that the thickness of the ion exchange coating layer does not exceed 200 µm. More preferably, the ion exchange coating layer may have a thickness of 0.1 µm to 100 µm.

Even more preferably, the ion exchange coating layer may be formed to have a thickness of 1 µm to 9 µm. The ion exchange coating layer according to an example, as the bipolar ion exchange sheet, may provide a function of providing adhesion between ion exchange coating layers in manufacturing the bipolar ion exchange sheet, as well as a function of improving the water decomposition efficiency by maintaining low membrane resistance, while having sufficient ion selectivity. Thus, the ion exchange coating layer may preferably be formed to have a thickness of 1 µm or more in order to provide the adhesion described above. Meanwhile, when the ion exchange coating layer has a thickness of 9 µm or more, the ion exchange coating layer may have lower effects that contribute to additional improvements in the ion selectivity, while the ion exchange coating layer may cause an increase in an ultimate thickness of the bipolar ion exchange sheet, thus increasing costs.

Accordingly, as illustrated in FIG. 1, the cation exchange membrane 100 and the anion exchange membrane 200 according to an example may be obtained, and the bipolar ion exchange sheet according to an example may be manufactured by bonding the respective ion exchange membranes 100 and 200 (including the cation exchange membrane and the anion exchange membrane, and used in the same sense unless otherwise mentioned), such that the cation exchange coating layer 120 and the anion exchange coating layer 220 may be in contact with each other.

In the bonding between the cation exchange membrane and the anion exchange membrane, the cation exchange coating layer 120 and the anion exchange coating layer 220 may adhere to each other, whereby the bipolar ion exchange sheet may be formed. In order to provide such adhesion, it may be preferable to bond the two ion exchange membranes before the ion exchange coating solution having a certain degree of adhesion is completely dried.

The bonding may be performed under conditions of heat and pressure, if necessary, and conditions thereof are not particularly limited. However, it may be preferable to perform the bonding in a range in which the ion exchange group of the ion exchange polymer is not decomposed by heating and pressurization.

As an example, the ion exchange coating layer may further include a water decomposition catalyst for promoting water decomposition, along with the ion exchange polymer. The water decomposition catalyst may be used without particular limitation, as long as it is powder that is not dissolved in water as a material, and it may be more preferable that the water decomposition catalyst include metal hydroxide nanoparticles. As the water decomposition catalyst, the metal hydroxide nanoparticle is not particularly limited, and nanoparticles of iron hydroxide ($FeOH_3$, $FeOH_2$) or chromium hydroxide ($CrOH_2$) may be used.

The water decomposition catalyst included in the ion exchange coating layer may be contained in an amount of 0.001 part by weight to 0.01 part by weight, based on 100 parts by weight of the ion exchange polymer. When less than 0.001 part by weight of the water decomposition catalyst is added, a problem may occur in which a water decomposition effect caused by the water decomposition catalyst may be less. When more than 0.01 part by weight of the water decomposition catalyst is added, a problem may occur in which a drying time may be increased and the water decomposition catalyst may cause color changes.

Meanwhile, according to an example, as illustrated in FIG. 2, the bipolar ion exchange sheet may further include a water decomposition catalyst layer 300 between the cation exchange coating layer 120 and the anion exchange coating layer 220. The water decomposition catalyst layer 300 may be provided to promote water decomposition, and the same water decomposition catalyst as that included in the ion exchange coating layers 120 and 220 may be used.

That is, as described in the example, the water decomposition catalyst layer may be individually formed between the ion exchange coating layers, while improving the water decomposition efficiency by adding the water decomposition catalyst to the ion exchange coating layers. When the water decomposition catalyst layer is formed, the ion exchange coating layers may or may not include the water decomposition catalyst.

The water decomposition catalyst layer may be formed by coating catalyst slurry, having water decomposition catalyst nanoparticles dispersed in a solvent, on a surface of one of the cation exchange coating layer or the anion exchange coating layer, and by drying the catalyst slurry. For example, when the water decomposition catalyst layer is formed on the surface of the cation exchange coating layer, the anion exchange coating layer may adhere to the cation exchange coating layer, having the water decomposition catalyst layer formed thereon, by adhesion of the anion exchange coating layer.

Isopropyl alcohol or the like may be used as the solvent, and the water decomposition catalyst layer formed of a catalyst material may be formed by performing spray coating of the catalyst slurry after drying the ion exchange coating layers, by drying the catalyst slurry, and by evaporating the solvent.

At this time, the formation of the water decomposition catalyst layer may be performed under conditions of heat and pressure, if necessary, but conditions thereof are not particularly limited. However, it may be preferable to perform the formation of the water decomposition catalyst layer in a range in which the ion exchange group of the ion exchange polymer is not decomposed by heating and pressurization.

Subsequently, the bipolar ion exchange sheet may be manufactured by bonding an ion exchange membrane, having the water decomposition catalyst layer formed thereon, to an ion exchange membrane, having no water decomposition catalyst layer formed thereon and having a different polarity, such that ion exchange coating solutions may be in contact with each other with the water decomposition catalyst layer as a boundary. In the bonding, it may preferable to bond the ion exchange membranes when the ion exchange coating solution for forming the ion exchange coating layer of the ion exchange membrane, on which the water decomposition catalyst layer is not formed, has a certain degree of adhesion without being completely dried.

At this time, the bonding may be performed under conditions of heat and pressure, if necessary, and conditions thereof are not particularly limited. It may only be preferable to perform the bonding in a range in which the ion exchange group of the ion exchange polymer is not decomposed by heating and pressurization.

The bipolar ion exchange sheet according to an example may have a symmetrical structure. In an example, the symmetrical structure may denote that the bipolar ion exchange sheet may have a cation adsorption sheet-cation exchange coating layer-anion exchange coating layer-anion adsorption sheet structure, based on a boundary between the ion exchange coating layers having different polarities, as illustrated in FIG. 1, and that the bipolar ion exchange sheet may have a cation adsorption sheet-cation exchange coating layer-water decomposition catalyst layer-anion exchange coating layer-anion adsorption sheet structure, based on the water decomposition catalyst layer, as illustrated in FIG. 2. At this time, the symmetry may denote that the stacking sequence and construction of the respective layers correspond to those of the respective layers having a different polarity.

The symmetry is not merely limited to the respective layers, corresponding to each other, having the same thicknesses, that is, the cation adsorption sheet and the anion adsorption sheet, and the anion exchange coating layer and the anion exchange coating layer are not limited to having the same thicknesses as each other. When the bipolar ion exchange sheet according to an example includes a large amount of cations in water to be used and treated, relatively great degrees of exchange and adsorption capabilities of the cation may be required in order to remove the cation included in the water. This is because the thicknesses of the cation adsorption sheet and the anion adsorption sheet may be different from those of the cation exchange coating layer and the anion exchange coating layer.

Figure 3:
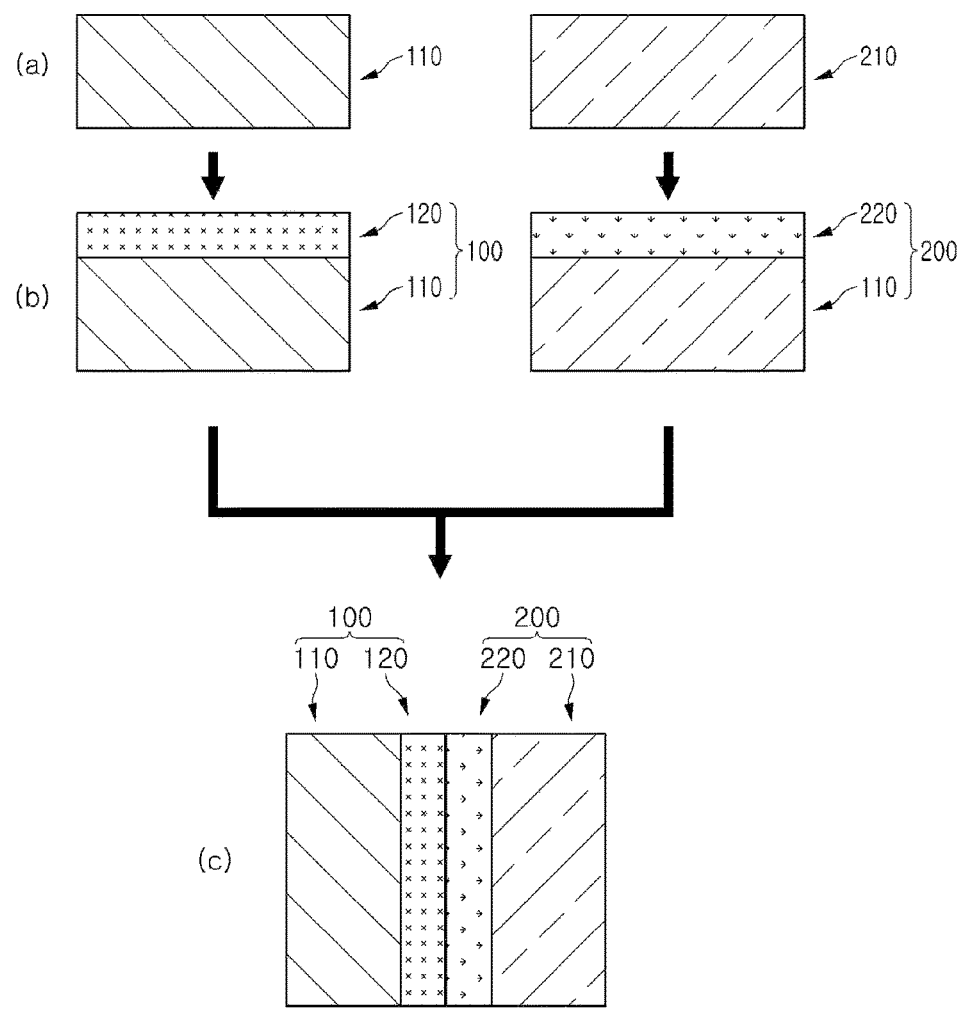
FIGS. 3A through 3C are diagrams of an example of a manufacturing process of the bipolar ion exchange sheet illustrated in FIG. 1.
Figure 4:
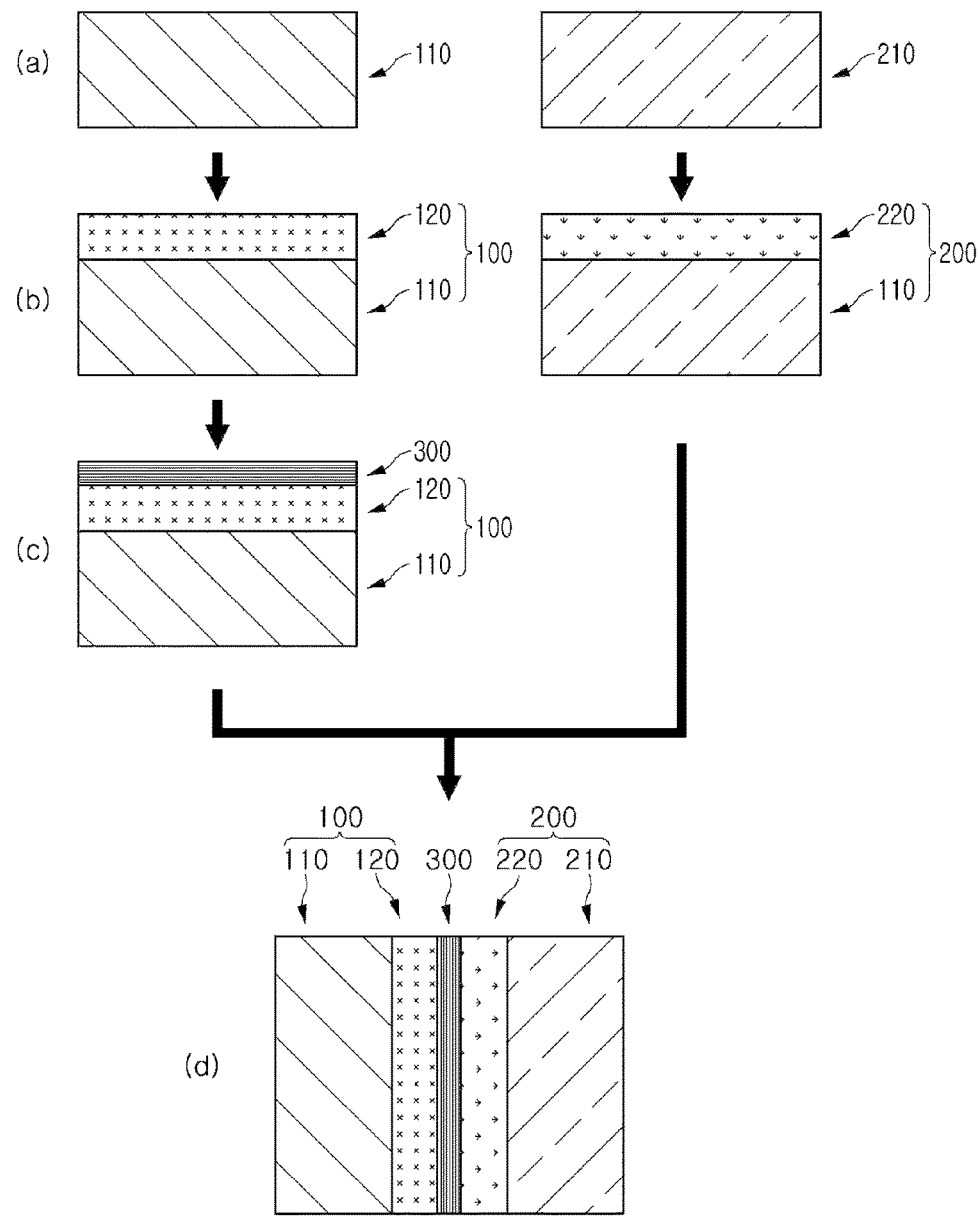
FIGS. 4A through 4D are diagrams of another example of a manufacturing process of the bipolar ion exchange sheet illustrated in FIG. 2.

Hereinafter, with reference to FIGS. 3 and 4, an exemplary example of a manufacturing method of a bipolar ion exchange sheet will be described in more detail. In the following description of the manufacturing method, repeated descriptions overlapping with those provided above will be omitted.

FIGS. 3A through 3C are views schematically illustrating a manufacturing example of a bipolar ion exchange sheet having a structure including an ion adsorption sheet and an ion exchange coating layer, and FIGS. 4A through 4D are views schematically illustrating a manufacturing example of a bipolar ion exchange sheet having a structure in which a water decomposition catalyst layer is introduced between ion exchange coating layers having both polarities in the structure of FIGS. 3A through 3C.

As seen from FIGS. 3A through 3C and 4A through 4D, a cation adsorption sheet 110 and an anion adsorption sheet 210 may be provided (refer to FIG. 3A). The ion adsorption sheets 110 and 210 may be provided as an extruded film by mixing an ion exchange resin powder with a polymer binder and then melting and extruding the mixture.

Subsequently, an ion exchange coating solution, in which a polymer having an ion exchange group having the same polarity is dissolved in an organic solvent, may be coated on one surface of each of the ion adsorption sheets 110 and 210 of the extruded film, and may then be dried to remove the organic solvent. Accordingly, ion exchange membranes 100 and 200, in which the ion exchange coating layers 120 and 220 are formed on the one surfaces of the ion adsorption sheets 110 and 210, may be manufactured, respectively (refer to FIG. 3B).

Although not illustrated in the drawings, the ion exchange coating layers may include a water decomposition catalyst formed of metal hydroxide nanoparticles.

Furthermore, as illustrated in FIGS. 3A through 3C, a bipolar ion exchange sheet may be manufactured by pressurizing and bonding the respective ion exchange membranes 100 and 200, such that the ion exchange coating layers having the respective polarities may be in contact with each other.

Meanwhile, as illustrated in FIGS. 4A through 4D, a bipolar ion exchange sheet may be manufactured by coating slurry, including metal hydroxide nanoparticles and a solvent, as a water decomposition catalyst, on a cation exchange coating layer 120 of a cation exchange membrane 100, by drying the coated slurry to form a water decomposition catalyst layer 300, and by disposing an anion exchange coating layer 220 of an anion exchange membrane 200 so as to contact the water decomposition catalyst layer 300 and then pressurizing and bonding the anion exchange coating layer 220 and the water decomposition catalyst layer 300.

According to the respective examples described above, a bipolar ion exchange sheet capable of adsorbing or desorbing ions in an electrical manner without using chemicals may be manufactured.

Mode for Invention

EXAMPLES

Hereinafter, the present disclosure will be described in more detail, according to examples.

Example 1

Production Example 1: Production of Porous Cation Adsorption Sheet

In order to produce a porous cation adsorption sheet, a cation exchange resin (Trilite CMP28, Samyang Corporation) was milled at 1,700 RPM with an air jet mill (Model Name: NETSCH-CONDUX, NETSCH) to prepare a cation exchange resin powder having an average particle size of 2.5 µm (a maximum of 10.2 µm).

A mixture was produced using 40 wt % of an LLDPE powder having an average particle diameter of 400 µm with respect to 60 wt % of the cation exchange resin powder with a ball mill. At this time, the LLDPE and cation exchange resin powders were mixed for 24 hours with a zirconium ball and a polyethylene (plastic) jar.

The porous cation adsorption sheet was produced by placing stainless spacers, having a 20 cm×20 cm internal space and a 200 μm thickness, between two stainless steel plates having a 25 cm×25 cm size, by evenly spreading 6 g of the mixture between the stainless spacers, and by heating the mixture for 10 minutes at 150° C. with a hot press.

Production Example 2: Production of Porous Anion Adsorption Sheet

In order to produce a porous anion adsorption sheet, an anion exchange resin (Trilite AMP28, Samyang Corporation) was milled at 1,700 RPM with an air jet mill (Model Name: NETSCH-CONDUX, NETSCH) to prepare an anion exchange resin powder having an average particle size of 3.7 μm (a maximum of 13.1 μm).

A mixture was produced by using 40 wt % of an LLDPE powder having an average particle diameter of 400 μm with respect to 60 wt % of the anion exchange resin powder with a ball mill. At this time, the LLDPE and anion exchange resin powders were mixed for 24 hours with a zirconium ball and a polyethylene (plastic) jar.

The porous anion adsorption sheet was produced by placing stainless spacers, having a 20 cm×20 cm internal space and a 200 μm thickness, between two stainless steel plates having a 25 cm×25 cm size, by evenly spreading 6 g of the mixture between the stainless spacers, and by heating the mixture for 10 minutes at 150° C. with a hot press.

Production Example 3: Formation of Cation Exchange Coating Layer on Porous Cation Adsorption Sheet Based on 100 parts by weight of polyetheretherketone (PEEK) (450PF, Dict, Korea), PEEK was dissolved in 10 parts by weight of sulfuric acid (98%) in a round bottom, four-necked flask, was then subjected to a sulfonation reaction for 24 hours while being stirred under a nitrogen atmosphere at 80° C., resulting in depositing a polymer with the addition of distilled water at −5° C.

A cation exchange resin formed of the sulfonated PEEK was produced by repeating, three times, a process of drying the deposited polymer in a vacuum oven at 80° C., dissolving the deposited polymer in dimethylacetamide (DMAc), and redepositing the deposited polymer in methanol to remove retained sulfuric acid, and by drying the resulting deposited polymer.

A cation exchange coating solution having a solid content of 20 wt % was produced by adding the dried sulfonated PEEK (SPEEK) to DMAc.

Thereafter, a porous cation exchange membrane was manufactured by coating the cation exchange coating solution (10 μm) on the porous cation adsorption sheet produced in Production Example 1 with a bar coater and drying the coated cation exchange coating solution for 12 hours in a vacuum oven at 50° C. to form a cation exchange coating layer.

Production Example 4: Formation of Water Decomposition Catalyst Layer

A catalyst layer was formed by spray coating nanoparticles of iron hydroxide ($Fe(OH)_3$), dispersed in isopropyl alcohol, on a surface of the cation exchange coating layer of the porous cation exchange membrane, on which the coating layer of the cation exchange coating solution produced in Preparation Example 3 is formed, and by drying the nanoparticles.

Production Example 5: Formation of Anion Exchange Coating Layer on Porous Anion Adsorption Sheet A polymer compound, produced by adding 0.1 wt % of benzoyl peroxide, an initiator, to a mixed solution of 0.5 mol of styrene, 1.5 mol of methyl methacrylate, and 2.0 mol of vinyl benzyl chloride to react with each other at 80° C. for 24 hours, was dissolved in dimethyl formamide (DMF), was then reacted with 1.5 mol of trimethylammonium chloride (TMA) at room temperature to deposit or separate methanol, and was dried in a vacuum at room temperature, thus compounding an anion exchange resin.

An anion exchange coating solution having a solid content of 20 wt % was produced by adding the compounded anion exchange resin to DMAc.

Thereafter, an anion exchange membrane having an anion exchange coating layer formed thereon was manufactured by coating the anion exchange coating solution (10 μm) on the porous anion adsorption sheet produced in Production Example 2 with a bar coater and drying the coated anion exchange coating solution for 30 minutes in a vacuum oven at 50° C.

The obtained anion exchange membrane was in a state in which the ion exchange coating layer coated on the anion adsorption sheet had no fluidity but had stickiness.

Production of Bipolar Ion Exchange Sheet

A bipolar ion exchange sheet having a catalyst layer was produced by stacking the cation exchange membrane, having the catalyst layer produced in Preparation Example 4, and the anion exchange membrane produced in Preparation Example 5, such that the catalyst layer formed on the cation exchange membrane and the anion exchange coating layer formed on the anion exchange membrane were in contact with each other, and by roll pressing the stacked cation exchange membrane and anion exchange membrane at 70° C. and then drying the stacked cation exchange membrane and anion exchange membrane for 12 hours in a vacuum oven at 50° C.

Example 2

A cation exchange membrane was produced in the same manner as that of Example 1, except that 0.01 part by weight of an iron hydroxide nanopowder was added to the cation exchange coating solution coated on the cation adsorption sheet according to Preparation Example 3 of Example 1, with respect to 100 parts by weight of SPEEK.

An anion exchange membrane was produced in the same manner as that of Example 1, except that 0.01 part by weight of an iron hydroxide nanopowder is added to the anion exchange coating solution coated on the anion adsorption sheet according to Preparation Example 5 of Example 1, with respect to 100 parts by weight of the compounded anion exchange resin.

A bipolar ion exchange sheet having a catalyst layer was produced by stacking the cation exchange membrane and the anion exchange membrane, such that the cation exchange coating layer formed on the cation exchange membrane and the anion exchange coating layer formed on the anion exchange membrane were in contact with each other, and by roll pressing the stacked cation exchange membrane and anion exchange membrane at 70° C. and then drying the stacked cation exchange membrane and anion exchange membrane for 12 hours in a vacuum oven at 50° C.

Comparative Example 1

A bipolar ion exchange sheet was produced by stacking the cation exchange membrane and the anion exchange membrane produced in Preparation Examples 3 and 5, such that the respective ion exchange coating layers were in contact with each other, and by roll pressing the stacked cation exchange membrane and anion exchange membrane at 70° C. and then drying the stacked cation exchange membrane and anion exchange membrane for 12 hours in a vacuum oven at 50° C.

Experimental Example: Confirmation of Water Decomposition Characteristics

Figure 5:
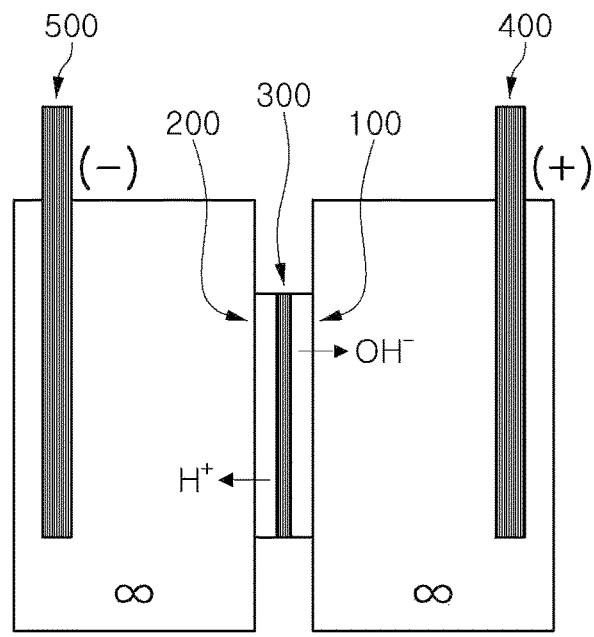
FIG. 5 is a diagram illustrating a cell for evaluating water decomposition characteristics of bipolar ion exchange sheets according to Examples and Comparative Examples.

Water decomposition characteristics of the bipolar ion exchange sheets of Examples 1 and 2 and Comparative Example 1 were evaluated using a 2-compartment non-flowing cell, as illustrated in FIG. 5. At this time, a 0.5 M NaCl solution was used as an electrolyte, an effective membrane area was 0.785 cm$^2$, and an applied current density was 50 mA/cm$^2$. In order to confirm a concentration of hydroxyl ions generated by water decomposition, changes in pH over time were measured, and a water decomposition membrane potential was measured with a digital multimeter using a pair of Ag/AgCl reference electrodes, as illustrated in FIG. 6.

Figure 6:
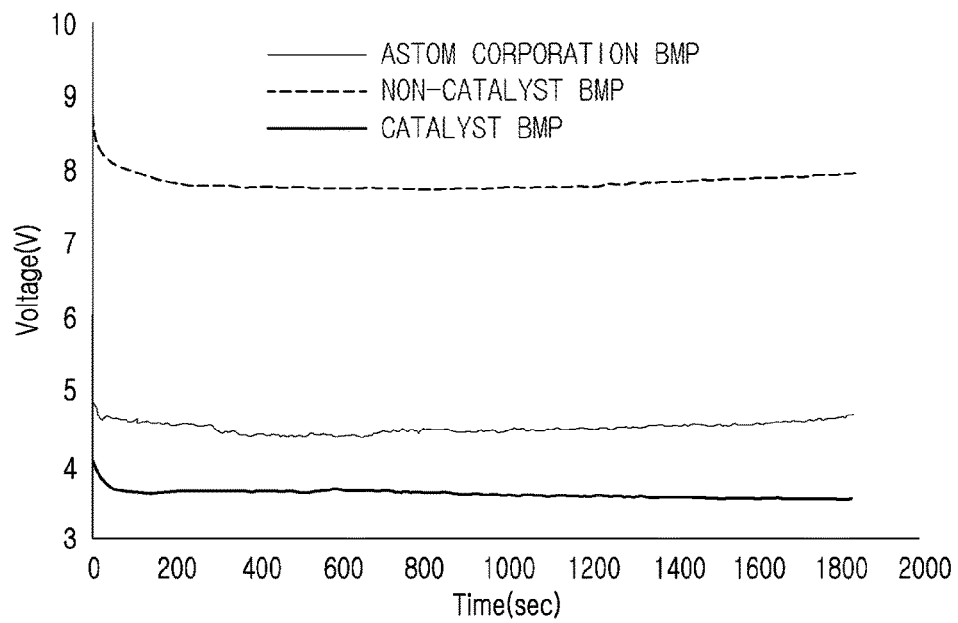
FIG. 6 is a graph illustrating the decomposition characteristics of the bipolar ion exchange sheets according to the Examples the Comparative Examples.

It can be seen from FIG. 6 that the bipolar ion exchange sheet (non-catalyst BPM) of Comparative Example 1 had a high level of water decomposition voltage, about 8 V, but the bipolar ion exchange sheets (catalyst BPM) of Examples 1 and 2 had a very low level of water decomposition voltage, about 3.7 V. It also can be seen that the bipolar ion exchange sheets (catalyst BPM) of Examples 1 and 2 had a lower level of water decomposition voltage, compared to a commercial bipolar membrane (BP-1E, Japan ASTOM Corporation) having water decomposition characteristics. Therefore, it can be confirmed that a bipolar ion exchange sheet having excellent water decomposition characteristics was produced.

Comparative Example 2

A bipolar ion exchange sheet was produced in the same manner as that of Example 1, except that the anion exchange membrane was produced by forming the cation exchange coating layer and the anion exchange coating layer at thicknesses of 0.05 μm, respectively, in Preparation Example 3 of Example 1.

The bipolar ion exchange sheet obtained in Comparative Example 1 represented a result in which cation and anion exchange membranes were not bonded strongly. It was determined that adhesion of the cation exchange membrane and the anion exchange membrane was not sufficient because the thickness of the ion exchange coating layer was thin.

While exemplary embodiments have been shown and described above, it will be apparent to those skilled in the art that modifications and variations could be made without departing from the scope of the present invention, as defined by the appended claims.

100: Cation Exchange Membrane
110: Cation Adsorption Sheet
120: Cation Exchange Coating Layer
200: Anion Exchange Membrane
210: Anion Adsorption Sheet
220: Anion Exchange Coating Layer
300: Water Decomposition Catalyst Layer

The invention claimed is:

1. A bipolar ion exchange sheet comprising:
a cation exchange membrane including a cation adsorption sheet and a cation exchange coating layer formed on one surface of the cation adsorption sheet; and
an anion exchange membrane including an anion adsorption sheet and an anion exchange coating layer formed on one surface of the anion adsorption sheet,
wherein the cation exchange membrane is bonded to the anion exchange membrane such that the cation exchange coating layer is in contact with the anion exchange coating layer,
wherein the cation exchange coating layer consists of a polymer having a cation exchange group, and
wherein the anion exchange coating layer consists of a polymer having an anion exchange group.

2. The bipolar ion exchange sheet of claim 1, wherein each of the cation adsorption sheet and the anion adsorption sheet is an extruded film.

3. The bipolar ion exchange sheet of claim 1, wherein the cation adsorption sheet includes a cation exchange resin powder and a binder.

4. The bipolar ion exchange sheet of claim 1, wherein the anion adsorption sheet includes an anion exchange resin powder and a binder.

5. The bipolar ion exchange sheet of claim 1, wherein each of the cation adsorption sheet and the anion adsorption sheet is a porous film.

6. The bipolar ion exchange sheet of claim 1, wherein each of the cation adsorption sheet and the anion adsorption sheet has a thickness of 10 μm to 1,000 μm.

7. The bipolar ion exchange sheet of claim 1, wherein the cation exchange coating layer and the anion exchange coating layer include metal hydroxide nanoparticles.

8. The bipolar ion exchange sheet of claim 1, further comprising a water decomposition catalyst layer between the cation exchange coating layer and the anion exchange coating layer.

9. The bipolar ion exchange sheet of claim 8, wherein the water decomposition catalyst layer includes metal hydroxide nanoparticles.

10. The bipolar ion exchange sheet of claim 9, wherein the metal hydroxide nanoparticles are at least one selected from the group consisting of iron hydroxide and chromium hydroxide.

11. The bipolar ion exchange sheet of claim 1, further comprising a symmetrical structure around a boundary between the cation exchange coating layer and the anion exchange coating layer.

12. A water treatment system comprising the bipolar ion exchange sheet according to claim 1.

13. A method of manufacturing a bipolar ion exchange sheet, the method comprising:
producing a cation adsorption sheet and an anion adsorption sheet;
producing, respectively, a cation exchange membrane and an anion exchange membrane by coating a cation exchange coating solution on one surface of the cation adsorption sheet to form a cation exchange coating layer consisting of a polymer having a cation exchange group and by coating an anion exchange coating solution on one surface of the anion adsorption sheet to form an anion exchange coating layer consisting of a polymer having an anion exchange group; and
bonding the cation exchange membrane to the anion exchange membrane such that the cation exchange coating layer is in contact with the anion exchange coating layer.

14. The method of claim 13, wherein each of the cation adsorption sheet and the anion adsorption sheet is an extruded film produced by melting and extruding a mixture of a binder resin and each of a cation exchange resin powder and an anion exchange resin powder.

15. The method of claim 13, wherein each of the cation exchange coating solution and the anion exchange coating solution includes metal hydroxide nanoparticles.

16. The method of claim 13, further comprising forming a water decomposition catalyst layer on one of the cation exchange membrane and the anion exchange membrane.

17. The method of claim 16, wherein the water decomposition catalyst layer is formed by coating slurry, having metal hydroxide nanoparticles dispersed in a solvent, on one of the cation exchange membrane and the anion exchange membrane.

18. The method of claim 17, wherein the metal hydroxide nanoparticles are at least one selected from the group consisting of iron hydroxide and chromium hydroxide.

* * * * *